July 25, 1933.                G. H. YASSO                1,919,582
                           DISPENSING DEVICE
                         Filed June 25, 1932          2 Sheets-Sheet 1
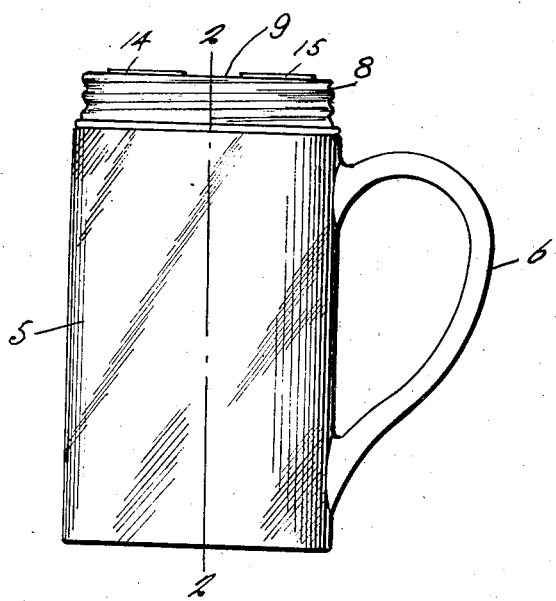
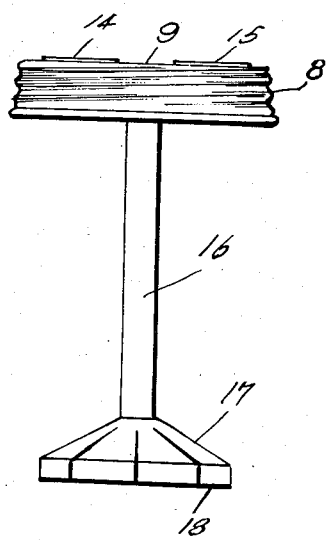
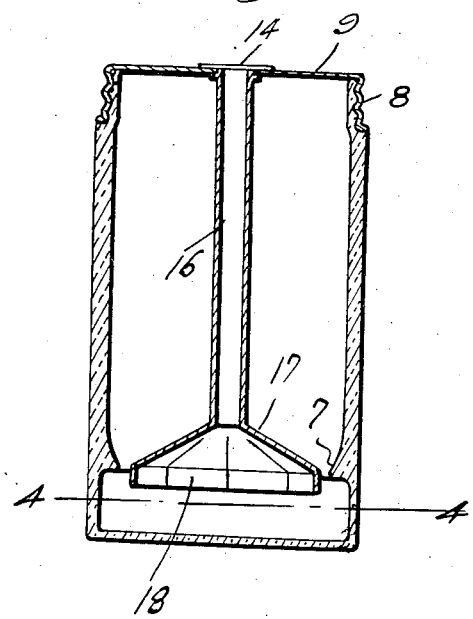
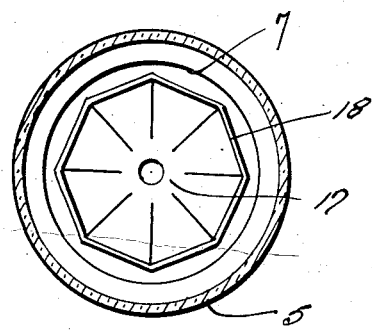
Inventor
George H Yasso.
By *Clarence A O'Brien*
                              Attorney July 25, 1933.  G. H. YASSO  1,919,582
DISPENSING DEVICE
Filed June 25, 1932   2 Sheets-Sheet 2
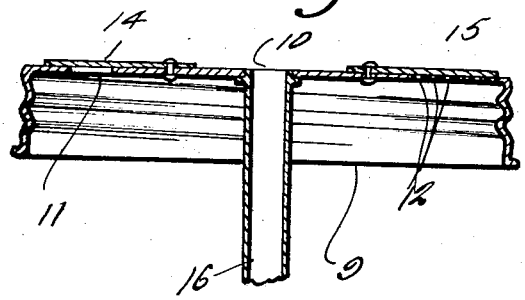
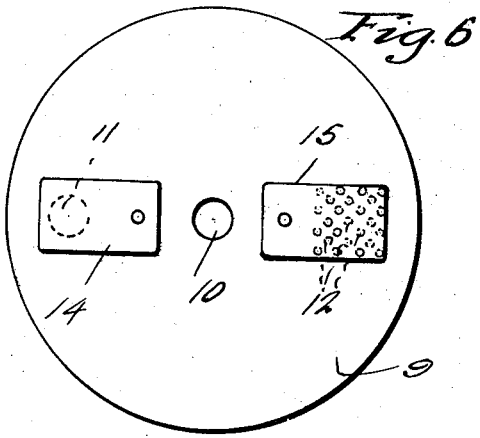
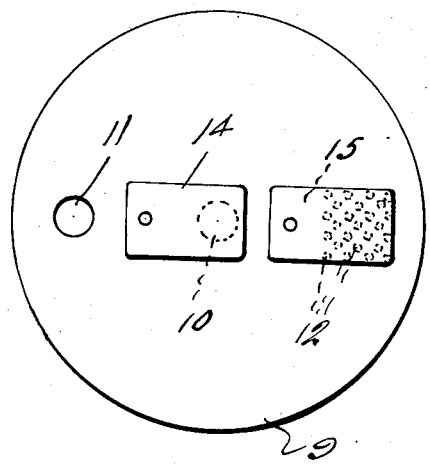
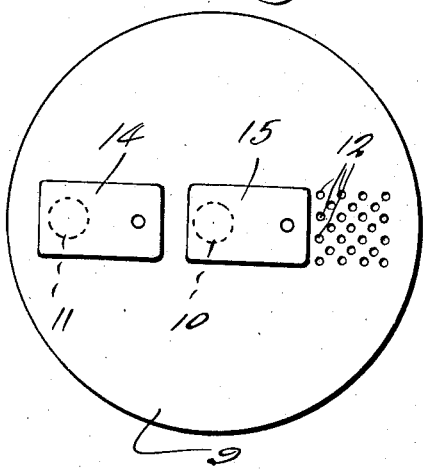
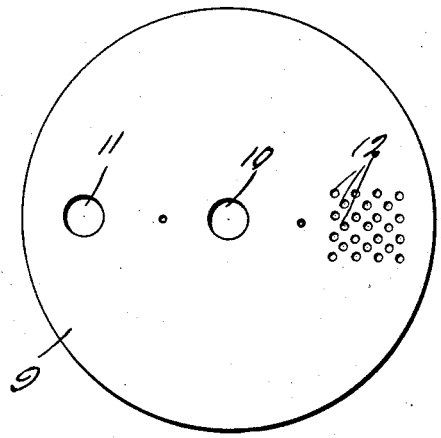
Inventor
George H. Yasso
By Clarence A. O'Brien
Attorney Patented July 25, 1933

1,919,582

UNITED STATES PATENT OFFICE

GEORGE HENRY YASSO, OF BETHLEHEM, PENNSYLVANIA

DISPENSING DEVICE

Application filed June 25, 1932. Serial No. 619,311.

The present invention relates to a dispensing device for use in conjunction with sugar, salt, pepper and the like and has for its object to provide a structure which is simple, inexpensive to manufacture, easy to manipulate and operate, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a dispensing device embodying the features of my invention.

Figure 2 is a vertical section therethrough taken substantially on the line 2—2 of Figure 1.

Figure 3 is a side elevation of the dispensing feature removed from the container.

Figure 4 is a horizontal section taken substantially on the line 4—4 of Figure 2.

Figure 5 is a detail section through the container closure.

Figures 6, 7, 8 and 9 are plan views thereof.

Referring to the drawings in detail it will be seen that the numeral 5 denotes a container with a handle 6 on the side thereof. Interiorly of the container 5 adjacent the lower end thereof is an inwardly projecting annular bead 7. The upper external portion of the container 5 is threaded to receive the threaded flange 8 of the closure 9. This closure 9 is provided with a central opening 10, and an off center opening 11 and a plurality of grouped off center apertures 12 diametrically situated with respect to the opening 11. Plates 14 and 15 are swivelly mounted on the closure so that they may be placed in any one of the positions shown in Figures 6, 7 and 8.

Numeral 16 denotes an elongated hollow stem the upper end of which is fixed in the opening 10. The lower end of the hollow stem 16 merges into a downwardly outwardly flared funnel 17 terminating in a flange or depending skirt 18 within the confines of the bead 7 and spaced inwardly therefrom.

It will be noted that when it be desired to remove a certain amount of the contents of the container 5 therefrom, it is only required to invert the latter whereby the contents will enter the funnel and stem and by then allowing the same to gravitate therefrom when the container is in inverted position the desired amount is obtained. By proper manipulation of the plates 14 and 15 the contents of the container may be dispensed either through the opening 11 or the perforations 12.

From the above detailed description it will be seen that the device may be used in substantially three ways, namely, (one) as a sugar or salt shaker, the group of apertures 12 being used for this purpose; (2) as a sugar or salt dispenser, the aperture 11 being used in this instance; and (3) for pouring a predetermined or measured quantity of sugar or salt, the aperture 10 being brought into use as is apparent.

In actual practice the container 5 acts as a reservoir; the funnel 17 acts as a measuring medium, being in the present instance of a size to accommodate a teaspoonful of sugar or salt and the slide closures 14, 15 can be easily manipulated for disposition in operative relation to the openings 10, 11 and 12.

To fill the container 5 the cap or closure 9 may be removed, or if it is desired to fill the container 5 with a limited amount of sugar or salt, the same may be poured into the container 5 through the opening 10, the sugar or salt as the case may be passing through the tube 16 downwardly into the container 5.

A device of this character will reduce to a minimum waste, will serve to maintain the sugar or salt from becoming contaminated, and also to prevent the sugar or salt from becoming hard or lumpy as often results from moisture absorbed by the sugar or salt.

It is thought that the construction, utility and operation of the device will now be clearly understood without a more detailed description thereof.

The present embodiment of the invention has been described in considerable detail merely for the purposes of exemplification, since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a dispensing device of the class described, a container, a closure therefor, said closure being provided with a centrally located aperture and a second aperture remote from the first named aperture, a hollow stem extending into the container from said closure and having an upper open end alined with the first named aperture in said closure, a funnel on the lower end of said stem, and a closure plate common to said apertures and swivelly mounted on the closure between said apertures.

2. In a dispensing device, a container, a closure cap for the container and provided with a centrally located opening, and also provided at one side of the centrally located opening with a second opening, and on a relatively opposite side of the centrally located opening with a group of relatively small perforations, a tube extending into the container from said closure cap in line with the centrally located opening, a funnel on the inner end of said tube, and a pair of closure plates pivoted to the closure cap on relatively opposite sides of the centrally located opening.

3. In a dispensing device of the kind described, a receptacle, a cap screw threaded on one end of the receptacle and provided with a centrally located opening, and a second opening remote from the centrally located opening, a tube fixedly secured to said cap and extending inwardly therefrom in line with the centrally located opening, a closure plate pivoted to the cap between said openings for movement into operative position relative to a selected one of the openings, a funnel on the inner end of said tube and provided at its widest end with a circular flange, and an internal annular bead on the wall of the container and spaced upwardly from the bottom thereof and situated opposite the funnel and providing a restricted passage between the funnel and the bead.

4. In a dispensing device of the kind described, a receptacle, a tube arranged longitudinally within the receptacle and in fixed concentric relation to the peripheral wall of the receptacle, said tube being open at each end, a funnel provided on the lower end of said tube, an internal annular bead on the wall of the container and spaced upwardly from the bottom of the container and a depending annular flange on said funnel disposed in spaced concentric relation to said bead and having a lower edge disposed in a plane below said bead.

GEORGE HENRY YASSO.